United States Patent
Takano et al.

(10) Patent No.: US 7,280,299 B2
(45) Date of Patent: Oct. 9, 2007

(54) RECORDING METHOD FOR MAGNETIC RECORDING MEDIUM, RECORDING DEVICE FOR MAGNETIC RECORDING MEDIUM AND MAGNETIC RECORDING MEDIUM

(75) Inventors: Masanori Takano, Miyagi (JP); Takashi Abe, Miyagi (JP); Nobufumi Takasu, Miyagi (JP); Yoshiyuki Watanabe, Miyagi (JP); Kiyoyuki Miyata, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/633,149

(22) Filed: Dec. 4, 2006

(65) Prior Publication Data

US 2007/0076319 A1   Apr. 5, 2007

Related U.S. Application Data

(62) Division of application No. 10/985,815, filed on Nov. 10, 2004, now Pat. No. 7,224,544.

(30) Foreign Application Priority Data

Nov. 10, 2003  (JP)  ............................. 2003-379620
May 26, 2004  (JP)  ............................. 2004-155417

(51) Int. Cl.
  *G11B 5/03*  (2006.01)
(52) U.S. Cl. .................. 360/66; 360/75; 360/77.12
(58) Field of Classification Search .................. None
  See application file for complete search history.

(56) References Cited

U.S. PATENT DOCUMENTS

| | | | |
|---|---|---|---|
| 5,572,392 A | 11/1996 | Aboaf et al. | |
| 6,282,051 B1 | 8/2001 | Albrecht et al. | |
| 6,940,678 B2 | 9/2005 | Kuo et al. | |
| 6,970,312 B2 * | 11/2005 | Yip et al. | 360/48 |
| 6,989,950 B2 | 1/2006 | Ohtsu | |
| 7,012,774 B2 | 3/2006 | Nakao et al. | |
| 7,142,388 B2 * | 11/2006 | Tateishi et al. | 360/77.12 |
| 2004/0051994 A1 | 3/2004 | Akiyama et al. | |
| 2005/0041324 A1 | 2/2005 | Tateishi et al. | |
| 2005/0052779 A1 * | 3/2005 | Nakao et al. | 360/77.12 |
| 2005/0168869 A1 * | 8/2005 | Dugas et al. | 360/118 |
| 2005/0254163 A1 * | 11/2005 | Nakao | 360/77.12 |

* cited by examiner

*Primary Examiner*—K. Wong
(74) *Attorney, Agent, or Firm*—Robert J. Depke; Rockey, Depke & Lyons, LLC.

(57) ABSTRACT

After a DC erasing is performed in a direction by permanent magnets on a servo signal recording part, servo signals are recorded in the signal recording area of the servo signal recording part by a magnetic field in the direction opposite to that of the DC erasing. Thus, in a recording method for a magnetic recording medium having a data signal recording part and the servo signal recording part on a magnetic layer, accurate servo signals can be recorded and reproduced even on the medium having the magnetic layer of 0.13 μm or smaller.

13 Claims, 9 Drawing Sheets

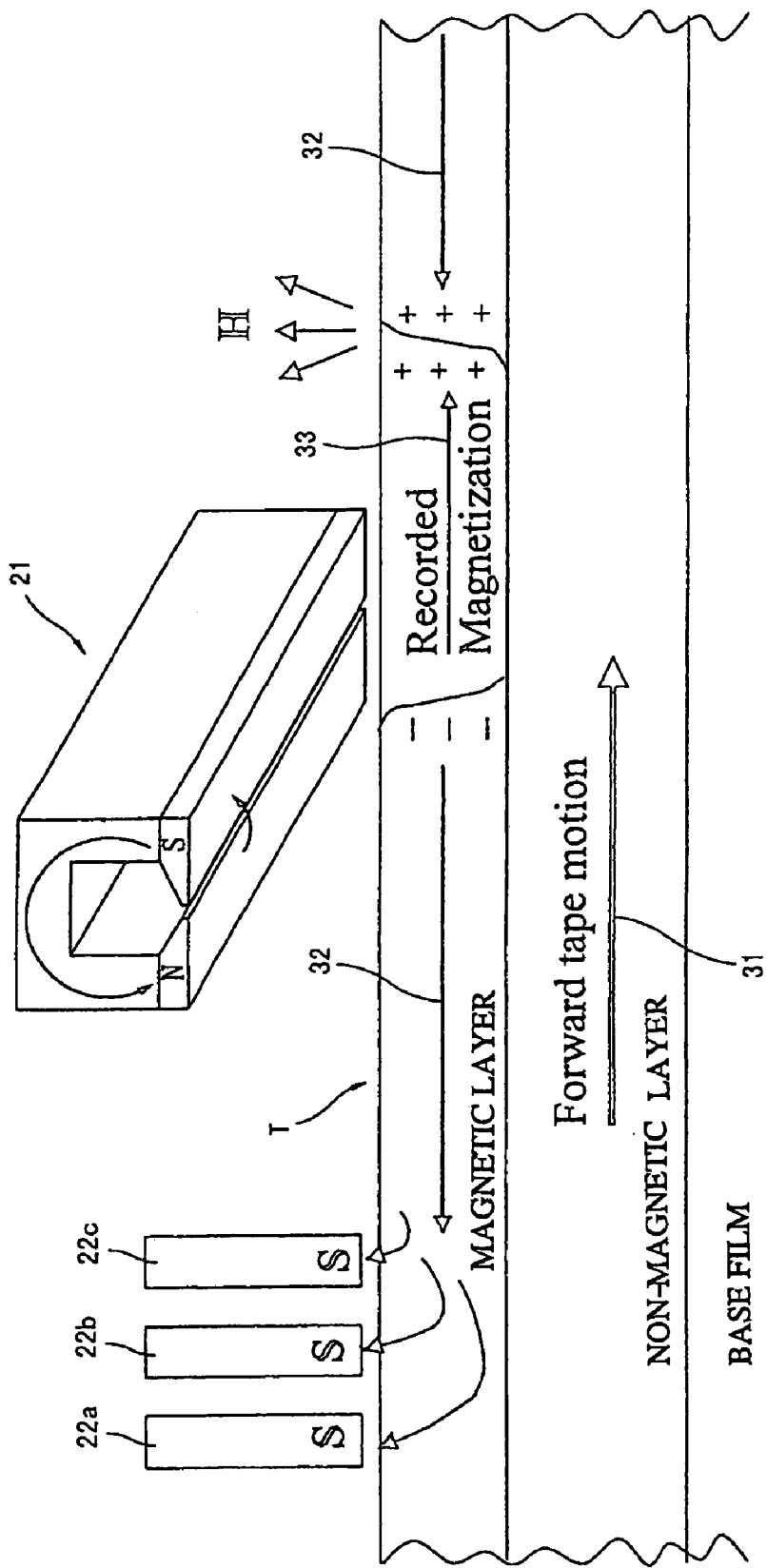

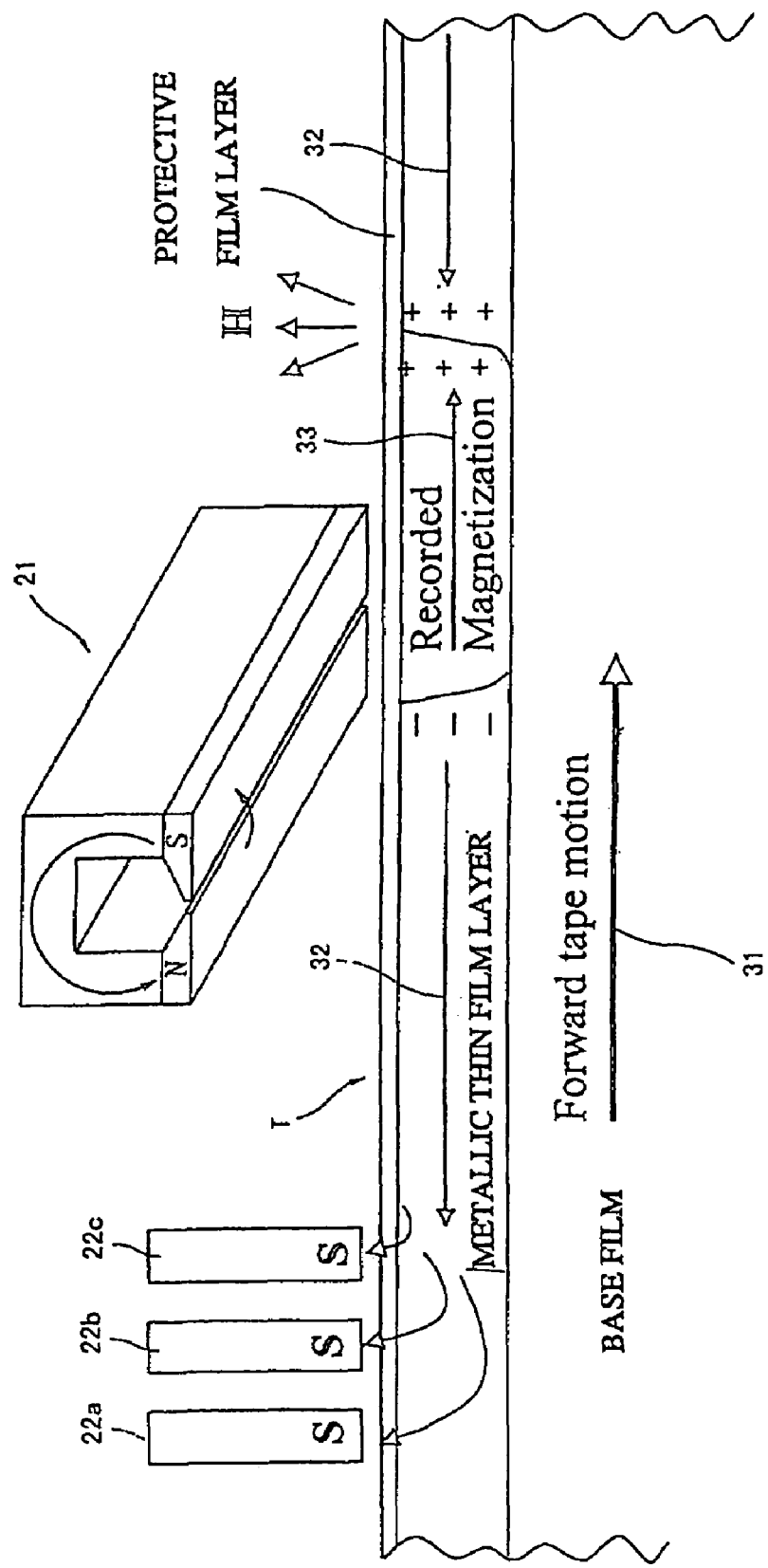

RECORDING METHOD FOR MAGNETIC RECORDING MEDIUM, RECORDING DEVICE FOR MAGNETIC RECORDING MEDIUM AND MAGNETIC RECORDING MEDIUM

The subject matter of application Ser. No. 10/985,815 is incorporated herein by reference. The present application is a Divisional of U.S. application Ser. No. 10/985,815, filed Nov. 10, 2004, now U.S. Pat. No. 7,224,544, which claims priority to Japanese Patent Application No. JP2003-379620, filed Nov. 10, 2003 and Japanese Patent Application No. JP2004-155417, filed May 26, 2004. The present application claims priority to these previously filed applications.

BACKGROUND OF THE INVENTION

1. Field of the Invention

The present invention relates to a recording method for a magnetic recording medium, a recording device for a magnetic recording medium and a magnetic recording medium.

2. Description of the Related Art

In recent years, a demand for a high-density recording has been increased. A property suitable for the high-density recording is also requested for a magnetic recording medium as a recording medium of information. Accordingly, various kinds of improvements are performed on the magnetic recording medium.

For instance, in a linear magnetic tape used for the recording medium of a computer or the like, recording tracks for recording the information in the longitudinal direction of the tape are provided. Distances between the recording tracks are narrowed to improve a track recording density and achieve the high-density recording.

However, when a magnetic head records and reproduces the information, the magnetic head jumps over an adjacent data recording track to move in the direction of width of the tape and access a prescribed recording track. Accordingly, when the distances between the recording tracks are too small, interference is generated between the recording tracks. Thus, the information cannot be precisely recorded and reproduced.

Thus, media having servo signals respectively between the recording tracks of the magnetic tape is developed. In the above-described media, servo signal parts are formed respectively between the recording tracks. Accordingly, the interference between the recording tracks upon recording and reproducing the information and the dislocation (off-track) of a reproducing head from the recording track can be prevented.

Thus, the track recording density can be more improved to achieve the high-density recording. Further, in the media in which these servo signals are recorded, the interference between the recording tracks upon recording and reproducing the information can be prevented, so that output characteristics or overwrite characteristics are improved.

The magnetic recording medium and a recording method for recording the servo signal are proposed in, for instance, Japanese Patent No. 3116531. Further, as DC (direct current) erasing means of the present invention, a magnetic head described in, for instance, Japanese Patent Application Laid-Open No. hei 10-124820, Japanese Patent Application Laid-Open No. hei 10-172109, Japanese Patent Application Laid-Open No. hei 9-282608, and Japanese Patent Application Laid-Open No hei 7-37225 can be used.

Further, a metallic thin film type magnetic recording medium and a method for producing a metallic thin film type magnetic recording medium are proposed in, for instance, Japanese Patent Application Laid-Open No. 2003-296919, Japanese Patent Application Laid-Open No. 2003-85742, Japanese Patent Application Laid-Open No. 2003-45018, Japanese Patent Application Laid-Open No. 2003-6851, Japanese Patent Application Laid-Open No. 2003-346329, Japanese Patent Application Laid-Open No. 2002-367135, and Japanese Patent Application Laid-Open No. 2002-245611.

In the magnetic tape having the high recording density, the servo signals are very important, so that all the servo signals need to have a high quality. Particularly, when the output of the servo signal is low, the position of the recording and reproducing head cannot be properly controlled. In an extreme case, a servo head undesirably misses the servo signal. Further, when time is not precisely recorded (jitter is large), the same problem may be possibly generated.

In a tape for storage having a higher recording density than that of a conventional tape, the thickness of a magnetic layer is apt to be reduced. In a conventional particulate type recording medium, when the thickness of a magnetic layer is about 0.15 µm to 0.20 µm, a sufficient output of a servo signal has been obtained.

In a conventional servo signal recording system, only servo signal parts are magnetized in the directions as shown arrow marks as illustrated in FIG. 9A and no signal parts are not magnetized. Accordingly, there is not a boundary area in which a magnetized direction is completely inverted, so that obtained signals are low in S/N ratio as shown in FIG. 9B.

Therefore, the media in which the thickness of the magnetic layer is smaller than 0.13 µm due to the high density recording can obtain only about half an output by the conventional servo signal recording system, which causes a great trouble for an accurate reproduction of the servo signals.

Further, what is called an evaporated tape in which a metallic thin film is directly formed on a base film also has an important problem to improve a servo output.

SUMMARY OF THE INVENTION

It is an object of the present invention to solve the problems of a prior art and to record and reproduce an accurate servo signal in a magnetic recording medium having a magnetic layer having the thickness of 0.13 µm or smaller.

In order to achieve the above-described object, the inventors of the present invention eagerly studied. Then, they obtained a knowledge that the directions of magnetization recorded on servo signal recording parts were different between signal recording sections and no signal recording sections so that a high reproduced output and a high S/N ratio could be obtained when a servo signal was reproduced.

Specifically, the present invention relates to a recording method for a magnetic recording medium having a data signal recording part and a servo signal recording part on a magnetic layer. The recording method comprises the steps of: DC (direct current) erasing the servo signal recording part; and then recording a servo signal in the signal recording area of the servo signal recording part by a magnetic field in the direction opposite to that of the DC erasing.

Further, the DC erasing is also performed to the data signal recording part.

Further, the DC erasing is performed by magnetizing the magnetic layer by a DC magnetic field.

Further, the present invention relates to a recording device for a magnetic recording medium having a data signal recording part and a servo signal recording part on a magnetic layer. The recording device comprises: a DC erasing means for DC erasing the servo signal recording part; and a servo signal recording means for recording a servo signal in the signal recording area of the servo signal recording part by a magnetic field in the direction opposite to that of the DC erasing.

The DC erasing means also DC erases the data signal recording part.

Further, the present invention relates to a magnetic recording medium having a data signal recording part and a servo signal recording part on a magnetic layer. In the magnetic recording medium, a DC erasing is performed to the servo signal recording part and then a servo signal is recorded in the signal recording area of the servo signal recording part by a magnetic field in the direction opposite to that of the DC erasing.

Further, the DC erasing is also performed to the data signal recording part.

Further, a magnetic film on which the servo signal is recorded is made of a metallic thin film.

Further, the DC erasing is performed by magnetizing the magnetic layer by a DC magnetic field.

In each of areas obtained by dividing the magnetic layer into a plurality of parts in the direction of width, the servo signal recording part and the data signal recording part are alternately formed. In the servo signal recording part, a plurality of servo signals having a first prescribed oblique direction with respect to an axis perpendicular to a longitudinal direction and a plurality of servo signals having a second oblique direction different from the first oblique direction are alternately recorded.

According to the present invention, the magnetizing direction of the signal recording area by recording the servo signals and the magnetizing direction of a non-signal area by DC erasing the servo signal recording part are opposite to each other. Accordingly, a boundary area in which the magnetizing direction is completely inverted is formed. Thus, a leakage flux is increased more than a conventional method so that a high reproduced output and a high S/N ratio can be obtained upon reproducing the servo signal and the servo signal can be more accurately and rapidly reproduced from the magnetic recording medium on which a high-density recording is carried out.

Accordingly, a jitter and a defect are reduced and a highly accurate tracking operation can be performed. As a result, a track pitch of the magnetic recording medium can be reduced to increase a recording density.

The present invention can extremely advantageously obtain the above-described effects in the magnetic recording medium having a magnetic layer of 0.03 μm to 0.13 μm.

BRIEF DESCRIPTION OF THE DRAWINGS

FIG. 3 is an explanatory view showing one example of a tape magnetizing direction in one embodiment of the present invention.

FIG. 4 shows a recording method in the embodiment of the present invention.

FIG. 8 is an explanatory view showing one example of a tape magnetizing direction in another embodiment of the present invention.

FIG. 9 shows a conventional recording method.

DETAILED DESCRIPTION OF THE PREFERRED EMBODIMENTS

Figure 1:
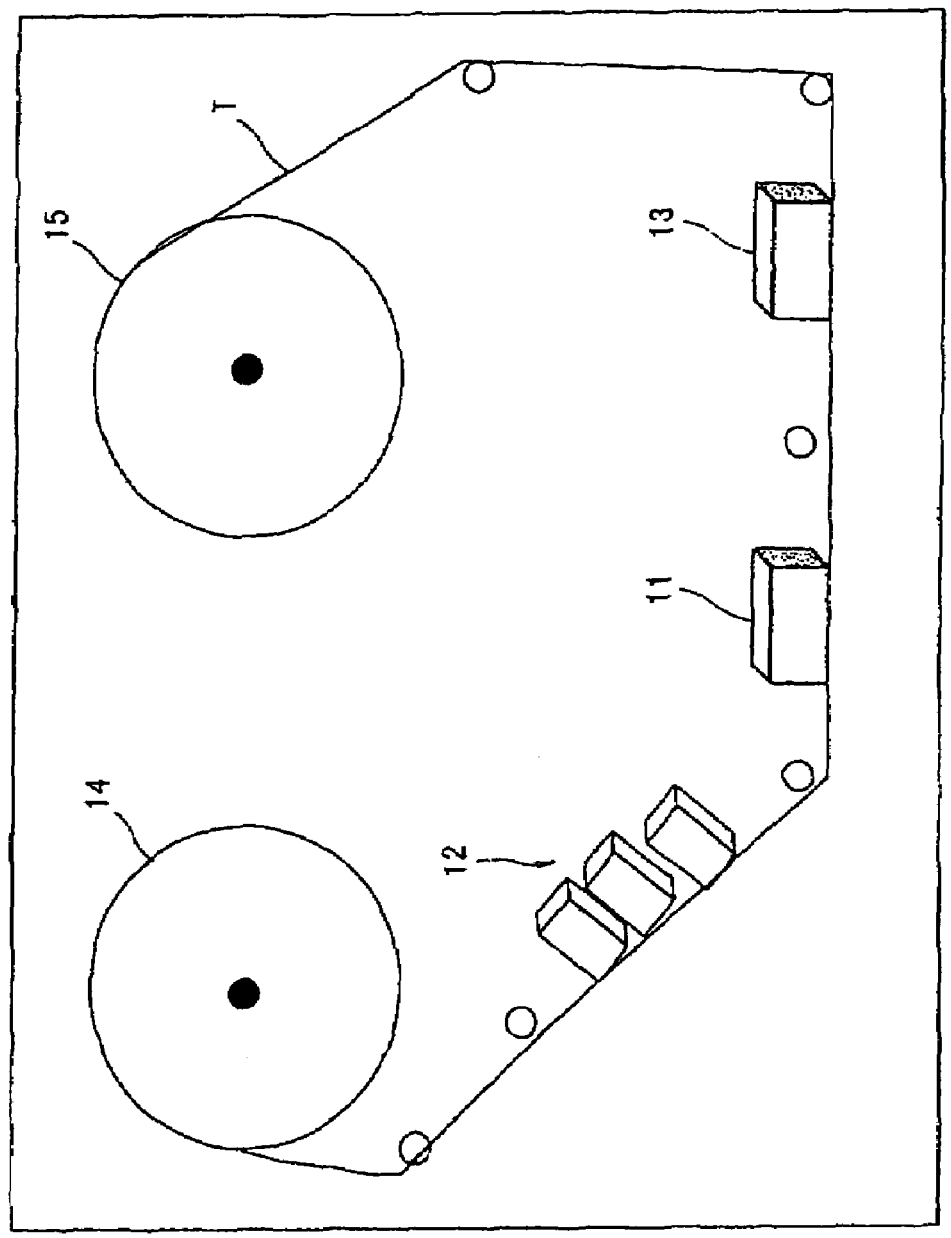
FIG. 1 is a conceptual view of a servo signal recording device according to one embodiment of the present invention.

Now, preferred embodiments of the present invention will be described in detail by referring to the drawings. FIG. 1 shows one example of a servo signal recording device according to the present invention and is a conceptual view of a device for recording a servo signal S on a magnetic tape T.

In FIG. 1, reference numeral 11 designates a recording head unit (servo signal recording means) in which a magnetic head (a recording head) for recording the servo signal S is disposed. Reference numeral 12 designates a DC (direct current) erasing unit (DC erasing means) having, for instance, three DC magnets for polarizing the magnetic tape T before a recording operation. 13 designates a reproducing head unit in which a magnetic head (a reproducing head) for reproducing the servo signal S is disposed.

Further, the servo signal recording device has conveying means for longitudinally conveying the magnetic tape T from a tape taking out part 14 to a tape winding part 15.

Figure 2:
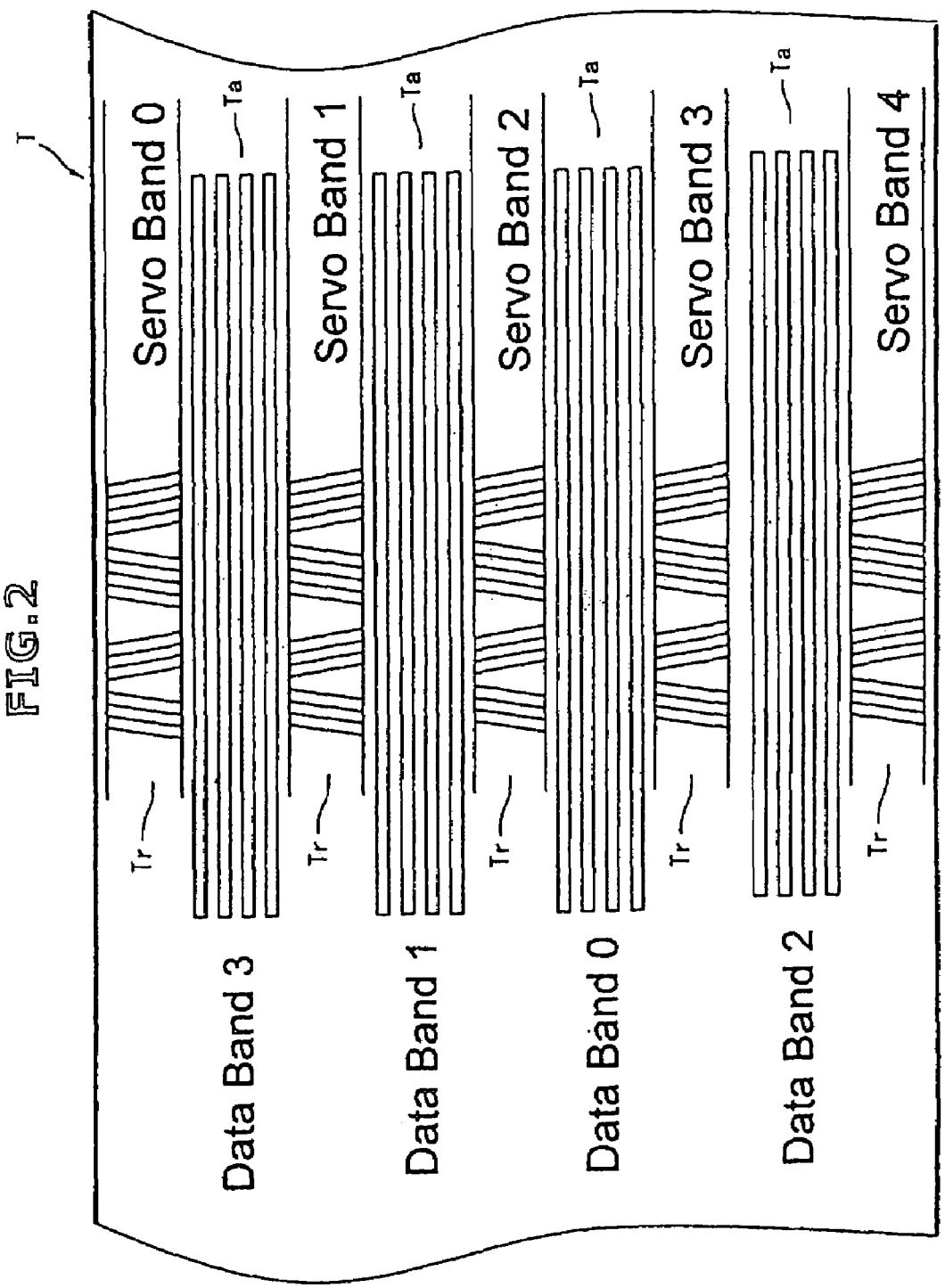
FIG. 2 is an explanatory view showing one example of a recording pattern of a magnetic tape according to the present invention.

FIG. 2 shows one example of a recording pattern of a magnetic recording medium for independently recording data signals and servo signals. In FIG. 2, servo band parts (Servo Bands 0 to 4) on which the servo signals S are recorded have a plurality of recording tracks Ta (data band parts; Data Bands 0 to 3) extending in the longitudinal direction in the direction of width. Servo tracks Tr are formed by sandwiching each of the recording tracks Ta in the direction of width in between them to arrange and record the servo signals S having a prescribed pattern in the longitudinal direction.

Accordingly, when the magnetic tape T has, for instance, four recording tracks Ta, five servo tracks Tr are formed. In the illustrated example, five servo signals S5a inclined at a prescribed angle, five servo signals S5b inclined in opposite directions thereto at the same angle, four servo signals 4a inclined at a prescribed angle and four servo signals S4b inclined at the same angle in opposite directions thereto are considered to be one pattern. This pattern is repeated to form the servo tracks Tr.

As a base material of the magnetic recording medium used for this embodiment, film type materials such as polyethylene terephthalate (PET), polyethylene naphthalate (PEN), polyamide resin (alamide), etc. are used. The present invention is applied to what is called a two-layer particulate type recording medium including a non-magnetic layer and a magnetic layer formed on the base. Further, as described below, the present invention may be applied to what is called an evaporated tape in which a magnetic layer such as Co, Ni is formed on the base by a vacuum evaporation method.

The thickness of the magnetic layer in the two-layer particulate type recording medium of this embodiment is desirably located within a range of 0.03 μm to 0.13 μm. When the thickness of the magnetic layer is not larger than 0.03 μm, the output of the servo signal cannot be sufficiently obtained due to the small thickness of the magnetic layer. When the thickness of the magnetic layer is not smaller than 0.13 μm, when the servo signal is recorded by a recording system of the present invention, a reproducing signal becomes too large. Thus, the amplification of the servo signal may be possibly saturated so that the servo signal cannot be accurately reproduced.

Further, the thickness of the non-magnetic layer is desirably located within a range of 0.5 μm to 2.5 μm. When the thickness of the non-magnetic layer is not larger than 0.5 μm, rough protrusions of a base film cannot be covered to cause a missing pulse (what is called a defect) to be generated.

The magnetic resistance of the magnetic tape of the present invention is desirably located within a range of 144 to 220 kA/m. When the magnetic resistance is not higher than 144 kA/m, the output of a data signal cannot be sufficiently obtained. Thus, the magnetic tape is not suitable for a mass storage medium.

As a recording method for magnetization, a recording method as shown, for instance, in FIG. 3 may be exemplified. In FIG. 3, reference numeral 21 designates a recording head in the head unit 11 shown in FIG. 1. 22a to 22c designate permanent magnets in the DC erasing unit 12 shown in FIG. 1.

The DC erasing is firstly performed using a magnetic field in the direction opposite to that of a magnetic field for recording the servo signal by using the permanent magnets 22a to 22c. Then, the servo signal is recorded by using the magnetic field in the opposite direction to that of the DC erasing by the recording head 21.

An arrow mark 31 in FIG. 3 shows a conveying direction of the magnetic tape T, an arrow mark 32 shows a DC magnetizing direction by DC erasing and an arrow mark 33 shows a magnetizing direction by recording, respectively.

As the above-described methods for DC erasing, a method of using a permanent magnet, a method of using a coil and a magnetic head or the like may be exemplified. The permanent magnet to be used has a residual magnetic flux density of 1.0 tesla or higher and a coercive force of 10000 oersted (796 kA/m) or higher so as not to locally generate unevenness in erasing due to a magnetic flux. As the permanent magnet having the above-described characteristics, a rare earth magnet including materials such as Nd—Fe—B (neodymium-iron-boron), Sm—Co (samarium-cobalt), or the like as main components may be employed. These permanent magnets may be plated with Ni and used.

When the magnets are arranged, it is important to allow the magnetic field opposite to the magnetic field for recording the servo signal to come near to the tape. When the magnetic field should be written in the same direction, the signal would be hardly outputted. Since the output of the servo signal is greatly associated with the quality (defect, jitter) of the servo signal, the output of the servo signal is desirably located within a range of 80 to 180 mV. When the output of the servo signal is not higher than 80 mV, a servo defect is too large so that a correct position cannot be traced by the head. To control the output of the servo signal, a distance between the permanent magnets 22a to 22c and the magnetic tape T is changed so that the intensity of the magnetic field due to the DC erasing can be controlled.

Figure 4A:
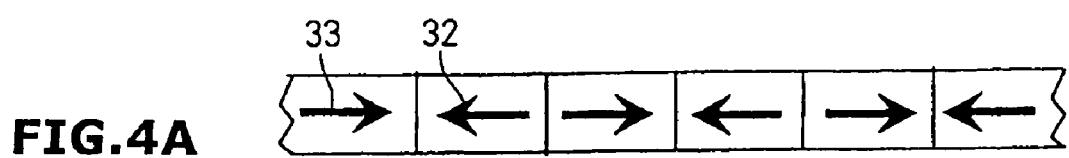
FIG. 4A is an explanatory view showing a tape magnetizing direction.

The servo signal is recorded as described above. Accordingly, the magnetizing direction (shown by the arrow mark 32) by DC erasing in a non-signal area is opposite to the magnetizing direction (shown by the arrow mark 33) by recording the signal in a signal recording area, as shown in FIG. 4A.

Figure 4B:
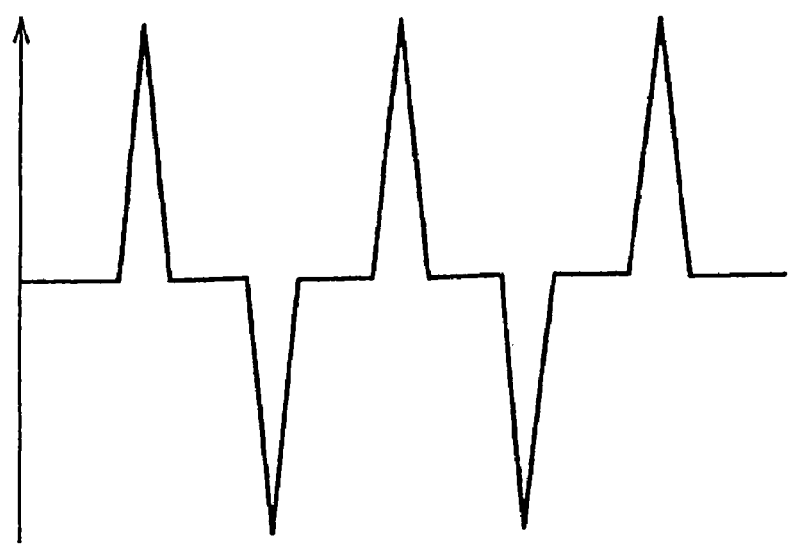
FIG. 4B is a signal waveform view.

Therefore, a boundary area in which the magnetizing direction is completely inverted is formed. Thus, a leakage flux is more increased than that of a conventional method and a high reproduced output and a high S/N ratio can be obtained upon reproducing the servo signal as shown in FIG. 4B.

EXAMPLE 1

Now, the present invention will be described on the basis of specific experimental results. In a two-layer particulate type media of this example, on a base film made of polyester terephthalate, a non-magnetic layer composed of $\alpha$-$Fe_2O_3$ and polyurethane is formed and a magnetic layer made of Co—Y—Fe ferromagnetic material and polyurethane is formed thereon as shown in FIG. 3.

| (Coating Material for Lower layer) | |
|---|---|
| $\alpha$-$Fe_2O_3$ | 100 parts by weight |
| vinyl chloride copolymer (MR-110 produced by Nippon Zeon Co., Ltd.) | 10 parts by weight |
| polyurethane resin (UR-8300 produced by Toyobo Co., Ltd.) | 10 parts by weight |
| carbon black | 20 parts by weight |
| butyl stearate | 2 parts by weight |
| stearic acid | 1 part by weight |
| methyl ethyl ketone | 100 parts by weight |
| toluene | 50 parts by weight |
| cyclohexanone | 100 parts by weight |

The above-described composition was kneaded by an extruder, premixed, then, dispersed by a sand mill, and processed by a filter with a filtration accuracy of 1 μm to prepare a coating material for a lower layer.

| (Coating Material for Upper Layer) | |
|---|---|
| Co-Y-Fe ferromagnetic material | 100 parts by weight |
| vinyl chloride copolymer (MR-110 produced by Nippon Zeon Co., Ltd.) | 10 parts by weight |
| polyurethane resin (UR-8200 produced by Toyobo Co., Ltd.) | 10 parts by weight |
| carbon black | 5 parts by weight |
| alumina | 10 parts by weight |
| butyl stearate | 2 parts by weight |
| stearic acid | 1 part by weight |
| methyl ethyl ketone | 100 parts by weight |
| toluene | 50 parts by weight |
| cyclohexanone | 100 parts by weight |

The above-described composition was kneaded by an extruder, premixed, then, dispersed by a sand mill, and processed by a filter with a filtration accuracy of 1 μm to prepare a coating material for an upper layer.

The coating material for the upper layer was filled with a curing agent (Coronate L produced by Nippon Polyurethane Industry Co., Ltd.) of 4 parts by weight and the coating material for the lower layer was filled with a curing agent of 2 parts by weight. Then, two layers were applied on the base film at the same time. After that, a pancake with the width of 12.650 mm was obtained via processes of calendering, curing and cutting. The thickness of the magnetic layer of the Example was located within a range of 0.08 to 0.15 µm.

(Example of Recording of Servo Signal)

As the permanent magnet for DC erasing, three Nd—Fe—B magnets having the magnetic resistance of 1038 kA/m and the residual magnetic flux density of 1.375 T were used to direct the magnetic field opposite to that for recording the servo signal to the magnetic tape. In this Example, an S pole was directed to the magnetic tape. A distance from the magnetic tape, the output of the servo signal and the quality of the servo signal are shown in Table 1.

TABLE 1

| Thickness of magnetic layer (µm) | Distance (mm) | Output (mv) | Defect (pieces) | Jitter (µs) |
|---|---|---|---|---|
| 0.13 | 0.3 | 200 | 15 | 34 |
| 0.13 | 0.5 | 180 | 16 | 35 |
| 0.13 | 0.7 | 150 | 17 | 35 |
| 0.13 | 0.8 | 125 | 80 | 50 |
| 0.13 | 1 | 80 | 300 | 65 |
| 0.11 | 0.3 | 180 | 16 | 35 |
| 0.08 | 0.3 | 150 | 18 | 35 |
| 0.15 | 0.3 | 220 | 14 | 32 |
| Standard value | | | 100 or smaller | 65 or smaller |

Now, items of the Table 1 will be respectively described below.

Distance: A distance between the magnetic tape and the permanent magnets was shown.

Output: An output obtained by reproducing the servo signal by the reproducing head was read by an oscilloscope and the read output was taken as an output.

Defect: the servo signal is reproduced by using an LTO-2 drive (Ultrium 460 produced by HP). A part in which an output decreases by 25% from the average value of the peak of the reproduced servo signals was considered to be a Defect and the average numbers per track in an entire length were indicated.

Jitter: the servo signal was reproduced by the same method as described above. S1 was obtained from the reproduced signal. S1 of 2048 frames was obtained and a standard deviation therefrom was taken as Jitter.

Figure 5:
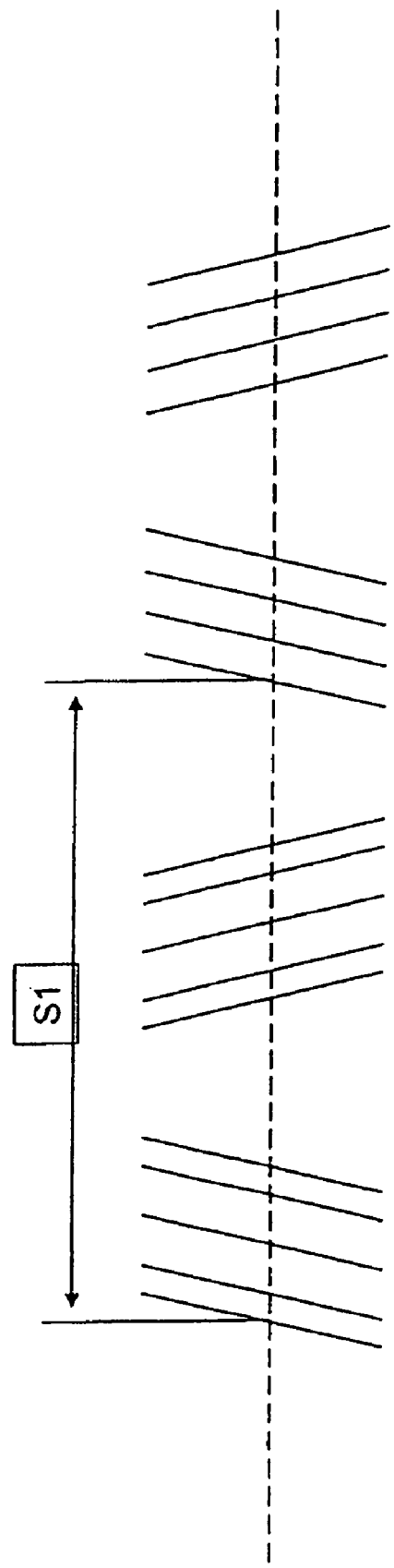
FIG. 5 is an explanatory view showing one example of a method for evaluating the quality of the servo signal.

S1 is defined as shown in FIG. 5. The evaluation of the Defect is determined by the evaluation standard of an LTO format.

As apparent from the Table 1, according to this Example, even when the thickness of the magnetic layer is decreased, the output and quality of the servo signal are good.

COMPARATIVE EXAMPLE

Then, the same pancake used in the above-described Example was used to AC erase. A coil was attached in place of the DC erasing magnet of a servo signal recording device to AC erase. A pancake in which the thickness of an upper layer is changed to a range of 0.08 to 0.18 µm was prepared and the output of the servo signal and the quality of the servo signal were evaluated in the same manner as described above. The results thereof were shown in Table 2.

TABLE 2

| Thickness of magnetic layer (µm) | Output (mv) | Defect (pieces) | Jitter (µs) |
|---|---|---|---|
| 0.18 | 220 | 11 | 34 |
| 0.15 | 150 | 14 | 35 |
| 0.13 | 110 | 285 | 58 |
| 0.1 | 80 | 300 | 66 |
| 0.08 | 60 | 500 | 68 |
| Standard value | | 100 or smaller | 65 or smaller |

It is recognized from the Table 2 that when the thickness of a magnetic layer is decreased, the output of the servo signal becomes low and the quality of the signal is deteriorated.

As described above, according to the present invention, since the servo signal can be recorded with the high reproduced output and the low Jitter, a highly accurate tracking operation can be carried out. Further, since the Defect is low, the highly accurate tracking operation can be performed. According to the present invention, the track pitch of the magnetic recording medium can be reduced to increase its recording density.

EXAMPLE 2

Figure 6:
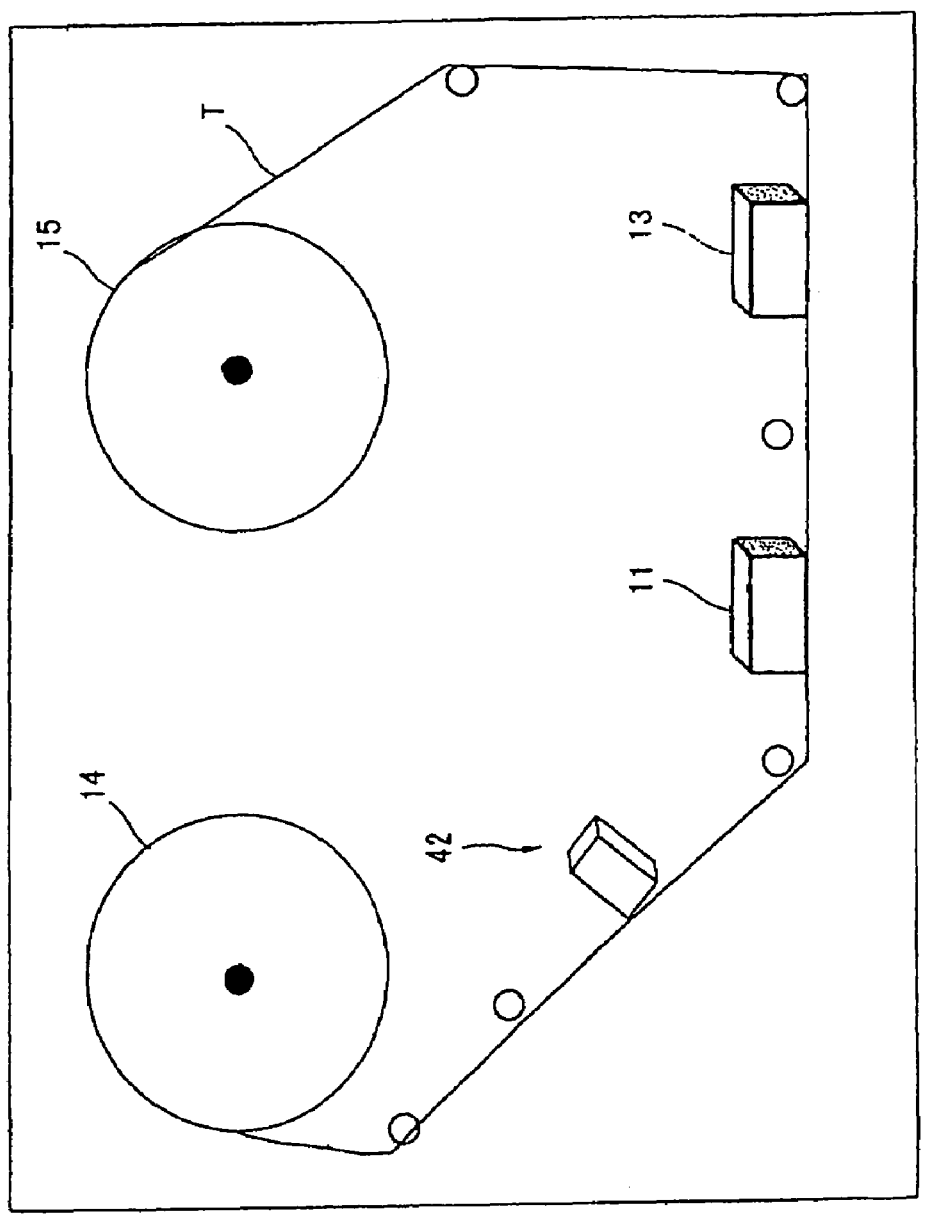
FIG. 6 is a conceptual view of a servo signal recording device according to another embodiment of the present invention.
Figure 7:
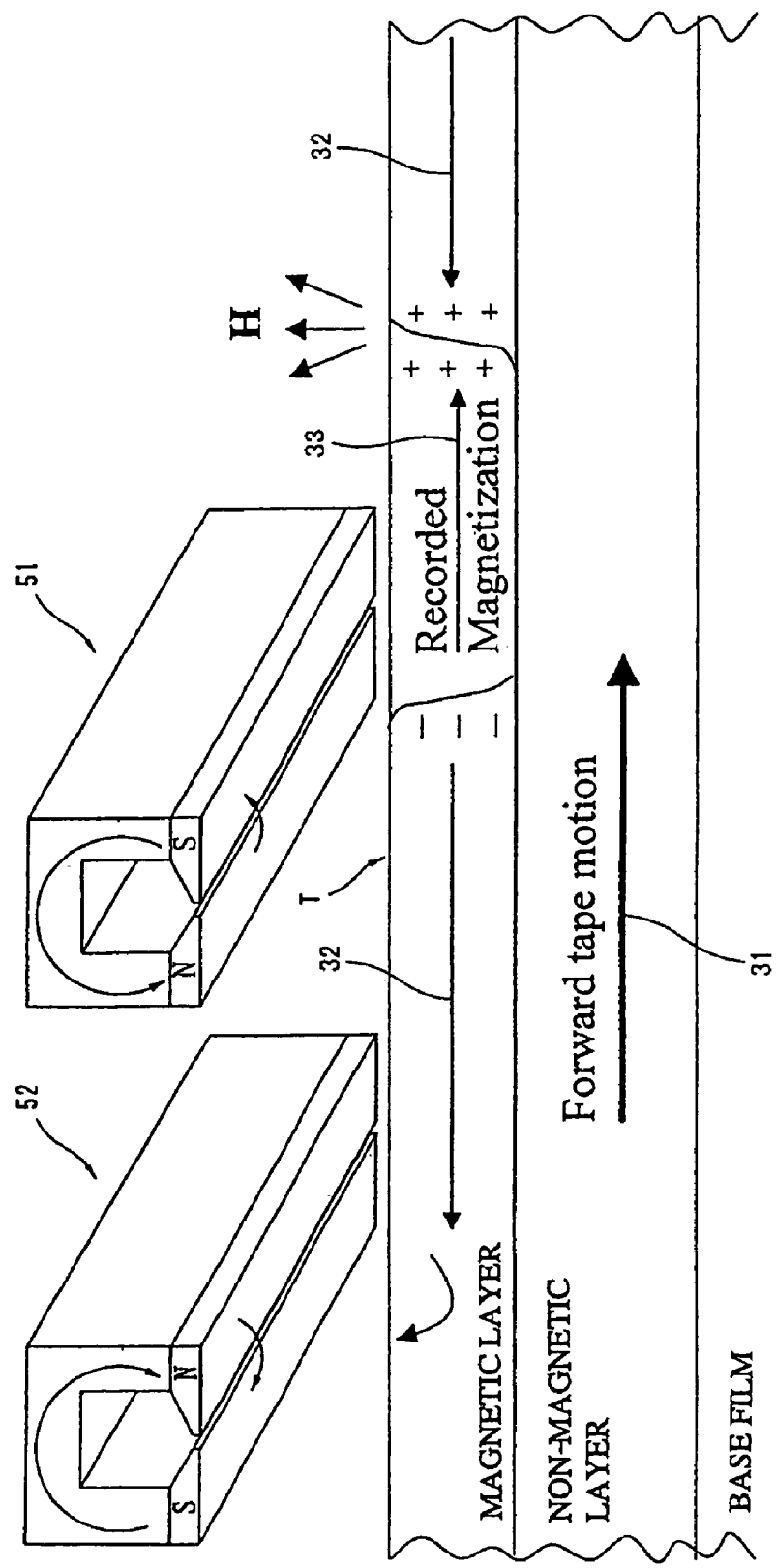
FIG. 7 is an explanatory view showing one example of a tape magnetizing direction in another embodiment of the present invention.
Figure 9A:
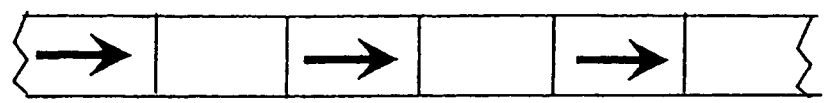
FIG. 9A is an explanatory view showing a tape magnetizing direction.
Figure 9B:
FIG. 9B is a signal waveform view.

Now, an embodiment in which a DC erasing is performed by using a magnetic head in place of the above-described permanent magnets will be described below by referring to FIGS. 6 and 7. In FIGS. 6 and 7, parts the same as those of FIGS. 1 and 3 are designated by the same reference numerals.

FIG. 6 shows a servo signal recording device according to this embodiment and is a conceptual view of a device for recording a servo signal S on a magnetic tape T. In FIG. 6, reference numeral 11 designates a recording head unit (servo signal recording means) in which a magnetic head (a recording head) for recording the servo signal S is disposed. Reference numeral 42 designates a servo part demagnetizing unit (DC erasing means) having a demagnetizing head disposed for erasing a servo signal part on the magnetic tape T before a recording operation. 13 designates a reproducing head unit in which a magnetic head (a reproducing head) for reproducing the servo signal S is disposed.

Further, the servo signal recording device has conveying means for longitudinally conveying the magnetic tape T from a tape taking out part 14 to a tape winding part 15.

The recording pattern of a magnetic recording medium in this embodiment is the same as that described in FIG. 2. Further, the structure of the magnetic recording medium, the thickness of a magnetic layer, the thickness of a non-magnetic layer, and the magnetic resistance of the magnetic tape are the same as those described in the above-described embodiment.

FIG. 7 is a recording method in this embodiment. In FIG. 7, reference numeral 51 designates a recording head in the recording head unit 11 shown in FIG. 6. 52 designates a DC erasing head in the servo part demagnetizing unit 42 shown in FIG. 6.

The DC erasing is firstly performed using a magnetic field in the direction opposite to that of a magnetic field for recording the servo signal by using the DC erasing head 52. Then, the servo signal is recorded by using the magnetic field in the opposite direction to that of the DC erasing by the recording head 51.

An arrow mark 31 in FIG. 7 shows a conveying direction of the magnetic tape T, an arrow mark 32 shows a DC magnetizing direction by DC erasing and an arrow mark 33 shows a magnetizing direction by recording, respectively.

As the above-described methods for DC erasing, heads for generating a magnetic field on a servo signal recording part may have any form. For instance, a thin film head having the same form as that of the servo signal recording head (51), a ring shaped head having a Gap only in the servo signal part or the like may be employed.

As for the structure of the thin film head, any of methods disclosed in Japanese Patent Application Laid-Open Nos. hei 10-124820, hei 10-172109 and hei 9-282608 may be employed. The structure of a bulk type head made of ferrite may be produced by a method disclosed in Japanese Patent Application Laid-Open No. hei 7-37225.

As for the direction (polarity) of electric current supplied to the demagnetizing head, it is important to retain on the tape the magnetic filed opposite to the magnetic field for recording the servo signal. When the magnetic field should be written in the same direction, the signal would be hardly outputted. Since the output of the servo signal is greatly associated with the quality (Defect, Jitter) of the servo signal, the output of the servo signal is desirably located within a range of 80 to 180 mV. When the output of the servo signal is not higher than 80 mV, a servo defect is too large so that the head cannot trace a correct position. To control the output of the servo signal, the electric current to be supplied to the DC erasing head 52 is changed, so that the intensity of the magnetic filed remaining on the tape can be controlled.

The servo signal is recorded as described above. Accordingly, the magnetizing direction (shown by the arrow mark 32) by DC erasing in a non-signal area is opposite to the magnetizing direction (shown by the arrow mark 33) by recording the signal in a signal recording area, as shown in FIG. 4A.

Therefore, a boundary area in which the magnetizing direction is completely inverted is formed. Thus, a leakage flux is more increased than that of a conventional method and a high reproduced output and a high S/N ratio can be obtained upon reproducing the servo signal as shown in FIG. 4B.

In a two-layer particulate type media of this example, on a base film made of polyester terephthalate, a non-magnetic layer composed of α-$Fe_2O_3$ and polyurethane is formed, and a magnetic layer made of Co—Y—Fe ferromagnetic material and polyurethane is formed thereon as shown in FIG. 7.

Then, a coating material for a lower layer and a coating material for an upper layer obtained in the same manner as those of the above-described Example 1 were prepared. The coating material for the upper layer was filled with a curing agent (Coronate L produced by Nippon Polyurethane Co., Ltd.) of 4 parts by weight and the coating material for the lower layer was filled with a curing agent of 2 parts by weight. Then, two layers were applied on the base film at the same time. After that, a pancake with the width of 12.650 mm was obtained via processes of calendering, curing and cutting. The thickness of the magnetic layer of the Example was located within a range of 0.08 to 0.15 μm.

(Example of Recording of Servo Signal)

The magnetic tape wound in the form of the pancake previously undergoes an AC demagnetizing process. Two servo signal recording heads are prepared. One head is used for a demagnetizing process, that is, used for the DC erasing head 52 shown in FIG. 7 and the other head is used for a recording the servo signal, that is, used for the recording head 51 shown in FIG. 7.

The electric current is constantly supplied to the demagnetizing head (52). The direction of supplying the electric current is opposite to the direction of the electric current to the recording head 51. The electric current to the recording head 51 is constantly set to 3.4 A under which an output does not change even when the electric current of a certain value or more is supplied.

The electric current supplied to the DC erasing head 52, the output of the servo signal and the quality of the servo signal are shown in Table 3.

TABLE 3

| Thickness of magnetic layer (μm) | Electric current (A) | Output (mv) | Defect (pieces) | Jitter (μs) |
|---|---|---|---|---|
| 0.13 | 3.6 | 200 | 15 | 34 |
| 0.13 | 3.4 | 180 | 16 | 35 |
| 0.13 | 3.0 | 150 | 18 | 35 |
| 0.13 | 2.6 | 125 | 83 | 50 |
| 0.13 | 2.0 | 80 | 315 | 65 |
| 0.11 | 3.4 | 180 | 16 | 36 |
| 0.08 | 3.4 | 150 | 17 | 35 |
| 0.15 | 3.4 | 220 | 14 | 32 |
| Standard value | | | 100 or smaller | 65 or smaller |

Now, items of the Table 3 will be respectively described below.

Electric Current: An electric current supplied to the DC erasing head 52 was shown.

Output: An output obtained by reproducing the servo signal by the reproducing head was read by an oscilloscope and the read output was taken as an output.

Defect: The servo signal is reproduced by using an LTO-2 drive (Ultrium 460 produced by HP). A part in which an output decreases by 25% from the average value of the peak of the reproduced servo signals was considered to be a Defect and the average numbers per track in an entire length were indicated.

Jitter: The servo signal was reproduced by the same method as described above. S1 was obtained from the reproduced signal. S1 of 2048 frames was obtained and a standard deviation therefrom was taken as Jitter.

S1 is defined as shown in FIG. 5. The evaluation of the Defect is determined by the evaluation standard of an LTO format.

As apparent from the Table 3, according to this Example, even when the thickness of the magnetic layer is decreased, the output and quality of the servo signal are good.

As the DC erasing head 52, a different head that is not the same as the recording head 51 may be used. In this case, the same servo signal recording head may be used as the recording head 51 and the DC erasing head 52 as described above. Thus, one magnetic head of the same kind as one servo signal recording head used in a conventional recording device may be added thereto, so that the structure of the device can be simplified.

EXAMPLE 3

Now, an embodiment in which the present invention is applied to an evaporated tape having a magnetic layer of Co, Ni or the like formed on a base by a vacuum evaporation method will be described below. The present invention is not limited to a below-described Example and may be applied to producing devices and producing methods disclosed, for instance, in Japanese Patent Application Laid-Open Nos. 2003-296919, 2003-85742, 2003-45018, 2003-6851, 2003-346329, 2002-367135 and 2002-245611, and any of metallic thin film type magnetic recording media having a medium structure.

Now, the present invention will be described on the basis of specific experimental results. In a metallic thin film type magnetic recording medium of this Example, on a base film made of polyester terephthalate, a metallic thin film layer made of Co is formed, and a carbon protective film layer is formed thereon as shown in FIG. 8.

Initially, a polyethylene terephtalate film having the thickness of 5.0 μm as a non-magnetic supporter was coated with Co by an oblique evaporation method by using a vacuum evaporation device to form a ferromagnetic metal thin film having the thickness of 50 nm as a magnetic layer. Then, on the ferromagnetic metal thin film, DC voltage of −1.5 kV was applied to the magnetic recording medium by a high frequency plasma of the mixed gas of ethylene and argon gas by using an electrode and the magnetic recording medium itself as an opposed electrode, and a discharging operation was carried out to form the carbon protective film having the thickness of about 8 nm on the ferromagnetic metal thin film.

Then, on a surface of the polyethylene terephtalate film opposite to a surface on which the ferromagnetic metal thin film was formed, a back coat layer (an illustration is omitted) having the thickness of 0.5 μm and made of carbon and a polyurethane resin was formed.

Then, the surface of the above-described protective film was exposed to the high frequency plasma generated under the conditions of the pressure of argon gas of 150 Pa, the applied voltage of 100 W, the frequency of 13.56 MHz for ten seconds.

Then, a material obtained by dissolving perfluoropolyether lubricant having a carboxyl group in a hexane solvent was applied to the carbon protective film with an amount of application of 5 mg/cm$^2$ to obtain the magnetic recording medium.

Then, a pancake having the width of 12.650 mm was obtained via processes of a hot roll and cutting. The thickness of the magnetic layer of the Example was located within a range of 0.03 to 0.13 μm.

In FIG. 8, a DC erasing is performed and a servo signal is recorded in the Example in the same manner as that shown in FIG. 3. The DC erasing is firstly performed using a magnetic field in the direction opposite to that of a magnetic field for recording the servo signal by using permanent magnets 22a to 22c. Then, the servo signal is recorded by using the magnetic field in the opposite direction to that of the DC erasing by a recording head 21.

(Example of Recording of Servo Signal)

As the permanent magnet for DC erasing, three Nd—Fe—B magnets having the magnetic resistance of 1038 kA/m and the residual magnetic flux density of 1.375 T were used to direct the magnetic field opposite to that for recording the servo signal to the magnetic tape. In this Example, an S pole was directed to the magnetic tape. A distance from the magnetic tape, the output of the servo signal and the quality of the servo signal are shown in Table 4.

TABLE 4

| Thickness of magnetic layer (μm) | Hc (kA/m) | Mrt (mA) | Distance (mm) | Output (mv) | Defect (pieces) | Jitter (μs) |
|---|---|---|---|---|---|---|
| 0.10 | 133 | 30 | 0.3 | 205 | 12 | 33 |
| 0.10 | 133 | 30 | 0.5 | 180 | 16 | 35 |
| 0.10 | 133 | 30 | 0.7 | 150 | 17 | 35 |
| 0.10 | 133 | 30 | 0.8 | 125 | 80 | 50 |
| 0.10 | 133 | 30 | 1.1 | 80 | 300 | 65 |
| 0.08 | 130 | 24 | 0.3 | 180 | 16 | 35 |
| 0.05 | 132 | 20 | 0.3 | 120 | 18 | 35 |
| 0.13 | 133 | 40 | 0.3 | 230 | 14 | 32 |
| Standard value | | | | | 100 or smaller | 65 or smaller |

Now, items of the Table 4 will be respectively described below.

Magnetic resistance Hc and Mrt: VSM produced by Toei Industry Co., Ltd. was used to measure hysteresis in an applied magnetic field of 15 kOe and obtain Hc and Mr. Mr was converted to a value per unit area of 1 cm$^2$ and the value was considered to be Mrt (mA).

Distance: A distance between the magnetic tape and the permanent magnets was shown.

Output: An output obtained by reproducing the servo signal by the reproducing head was read by an oscilloscope and the read output was taken as an output.

Defect: The servo signal is reproduced by using an LTO-2 drive (Ultrium 460 produced by HP). A part in which an output decreases by 25% from the average value of the peak of the reproduced servo signals was considered to be a Defect and the average numbers per track in an entire length were indicated.

Jitter: The servo signal was reproduced by the same method as described above. S1 was obtained from the reproduced signal. S1 of 2048 frames was obtained and a standard deviation therefrom was taken as Jitter.

S1 is defined as shown in FIG. 5. The evaluation of the Defect is determined by the evaluation standard of an LTO format.

As apparent from the Table 4, according to this Example, even when the thickness of the magnetic layer is decreased, the output and quality of the servo signal are good.

COMPARATIVE EXAMPLE

Then, the same pancake used in the above-described Example was used to AC erase. A coil was attached in place of the DC erasing magnet of a servo signal recording device to AC erase. A pancake in which the thickness of an upper layer was changed to a range of 0.08 to 0.18 μm was prepared and the output of the servo signal and the quality of the servo signal were evaluated in the same manner as described above. The results thereof are shown in Table 5.

TABLE 5

| Thickness of magnetic layer (μm) | Hc (kA/m) | Mrt (mA) | Output (mv) | Defect (pieces) | Jitter (μs) |
|---|---|---|---|---|---|
| 0.18 | 133 | 70 | 220 | 11 | 34 |
| 0.15 | 133 | 55 | 150 | 14 | 35 |

TABLE 5-continued

| Thickness of magnetic layer (μm) | Hc (kA/m) | Mrt (mA) | Output (mv) | Defect (pieces) | Jitter (μs) |
|---|---|---|---|---|---|
| 0.13 | 133 | 40 | 110 | 285 | 58 |
| 0.10 | 133 | 30 | 80 | 300 | 66 |
| 0.08 | 130 | 24 | 60 | 500 | 68 |
| Standard value | | | | 100 or smaller | 65 or smaller |

It is recognized from the Table 5 that when the thickness of a magnetic layer is decreased, the output of the servo signal becomes low and the quality of the signal is deteriorated.

The DC erasing may be performed not only to the servo signal recording part, but also to the data signal recording part.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

What is claimed is:

1. A magnetic recording medium having a data signal recording part and a servo signal recording part on a magnetic layer, wherein a DC erasing is performed to the servo signal recording part by a magnetic field in a first direction, and then a servo signal is recorded in the signal recording area of the servo signal recording part by a magnetic field in a second direction opposite to that of the first direction.

2. The magnetic recording medium according to claim 1, wherein the DC erasing is also performed to the data signal recording part.

3. The magnetic recording medium according to claim 2, wherein a magnetic film on which the servo signal is recorded is made of a metallic thin film.

4. The magnetic recording medium according to claim 3, wherein the DC erasing is performed by magnetizing the magnetic layer by a DC magnetic field.

5. The magnetic recording medium according to claim 2, wherein the DC erasing is performed by magnetizing the magnetic layer by a DC magnetic field.

6. The magnetic recording medium according to claim 1, wherein a magnetic film on which the servo signal is recorded is made of a metallic thin film.

7. The magnetic recording medium according to claim 6, wherein the DC erasing is performed by magnetizing the magnetic layer by a DC magnetic field.

8. The magnetic recording medium according to claim 1, wherein the DC erasing is performed by magnetizing the magnetic layer by a DC magnetic field.

9. The magnetic recording medium according to claim 1, wherein said magnetic recording medium comprises a magnetic layer and a non-magnetic layer, and wherein said magnetic layer has a thickness of 0.03 μm to 0.13 μm.

10. The magnetic recording medium according to claim 9, wherein said non-magnetic layer has a thickness of 0.5 μm to 2.5 μm.

11. The magnetic recording medium according to claim 9, wherein a magnetic resistance of the magnetic recording medium is within a range of 144 kA/m to 220 kA/m.

12. The magnetic recording medium according to claim 1, wherein said first direction is substantially opposite to the direction of travel of the magnetic recording medium.

13. The magnetic recording medium according to claim 12, wherein said second direction is substantially the same as the direction of travel of the magnetic recording medium.

* * * * *